US010620011B2

(12) United States Patent
Cheaz et al.

(10) Patent No.: US 10,620,011 B2
(45) Date of Patent: Apr. 14, 2020

(54) AUTONOMOUS VEHICLE ROUTING

(71) Applicant: INTERNATIONAL BUSINESS MACHINES CORPORATION, Armonk, NY (US)

(72) Inventors: Nixon Cheaz, Cary, NC (US); William T. Cochran, Cary, NC (US); Anthony M. Diaz, Durham, NC (US); Bradley M. Segobiano, Efland, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 548 days.

(21) Appl. No.: 15/348,614

(22) Filed: Nov. 10, 2016

(65) Prior Publication Data

US 2018/0128628 A1   May 10, 2018

(51) Int. Cl.
*G01C 21/34* (2006.01)
*G05D 1/02* (2020.01)
*H04W 84/00* (2009.01)
*G08G 1/00* (2006.01)
*G06Q 10/08* (2012.01)
*G06Q 10/04* (2012.01)

(52) U.S. Cl.
CPC ....... *G01C 21/3438* (2013.01); *G05D 1/0297* (2013.01); *G06Q 10/047* (2013.01); *G06Q 10/083* (2013.01); *G08G 1/202* (2013.01); *H04W 84/00* (2013.01); *G05D 2201/0213* (2013.01)

(58) Field of Classification Search
None
See application file for complete search history.

(56) References Cited

U.S. PATENT DOCUMENTS

| 8,346,480 | B2 | 1/2013 | Trepagnier et al. |
| 9,286,587 | B2 | 3/2016 | Briggs et al. |
| 9,494,439 | B1 * | 11/2016 | Ross ................ B60W 50/029 |
| 9,786,187 | B1 * | 10/2017 | Bar-Zeev ......... G06Q 10/08355 |

(Continued)

FOREIGN PATENT DOCUMENTS

| JP | 2003167628 | 6/2003 |
| WO | WO 2015147224 | 1/2015 |

OTHER PUBLICATIONS

Peter Mell et al., "The NIST Definition of Cloud Computing", National Institute of Standards and Technology, U.S. Department of Commerce, NIST Special Publication 800-145, Sep. 2011, 7 pages.

*Primary Examiner* — Shelley Chen
(74) *Attorney, Agent, or Firm* — Robert Shatto, Esq.; George S. Blasiak, Esq.; Heslin Rothenberg Farley & Mesiti P.C.

(57) ABSTRACT

Methods, computer program products, and systems are presented. The method computer program products, and systems can include, for instance: obtaining, by one or more processor, one or more vehicle parameter of first and second moving vehicles; processing, by the one or more processor, the one or more vehicle parameter of first and second moving vehicles to determine rendezvous point information; outputting, by the one or more processor, data of the rendezvous point information to the first and second moving vehicles; and repeating, by the one or more processor, the obtaining, the processing and the outputting.

19 Claims, 9 Drawing Sheets

(56) References Cited

U.S. PATENT DOCUMENTS

| | | | | |
|---|---|---|---|---|
| 9,809,305 B2* | 11/2017 | Buchmueller | ........ | B64C 39/024 |
| 10,216,188 B2* | 2/2019 | Brady | .................. | G05D 1/0088 |
| 2013/0226433 A1* | 8/2013 | Tominaga | ......... | B60W 50/0097 |
| | | | | 701/96 |
| 2016/0117936 A1 | 4/2016 | Klinger et al. | | |
| 2016/0364678 A1* | 12/2016 | Cao | ........................ | G06Q 50/30 |
| 2018/0024554 A1* | 1/2018 | Brady | .................. | G05D 1/0088 |
| | | | | 701/23 |

* cited by examiner

US 10,620,011 B2

AUTONOMOUS VEHICLE ROUTING

BACKGROUND

The present disclosure relates autonomous vehicles and particularly to routing for autonomous vehicles.

Autonomous vehicles are automobiles that have the ability to operate and navigate without human input. Autonomous vehicles use sensors, such as radar, LIDAR, global positioning systems, and computer vision, to detect the vehicle's surroundings. Advanced computer control systems interpret the sensory input information to identify appropriate navigation paths, as well as obstacles and relevant signage. Some autonomous vehicles update map information in real time to remain aware of the vehicle's location even if conditions change or the vehicle enters an uncharted environment.

SUMMARY

The shortcomings of the prior art are overcome, and additional advantages are provided, through the provision, in one aspect, of a method. The method can include, for example: obtaining, by one or more processor, one or more vehicle parameter of first and second moving vehicles; processing, by the one or more processor, the one or more vehicle parameter of first and second moving vehicles to determine rendezvous point information; outputting, by the one or more processor, data of the rendezvous point information to the first and second moving vehicles; and repeating, by the one or more processor, the obtaining, the processing and the outputting.

In another aspect, a computer program product can be provided. The computer program product can include a computer readable storage medium readable by one or more processing unit and storing instructions for execution by one or more processor for performing a method. The method can include for example: obtaining one or more vehicle parameter of first and second moving vehicles; processing the one or more vehicle parameter of first and second moving vehicles to determine rendezvous point information; outputting data of the rendezvous point information to the first and second moving vehicles; and repeating the obtaining, the processing and the outputting.

In a further aspect, a system can be provided. The system can include, for example a memory. In addition, the system can include one or more processor in communication with the memory. Further, the system can include program instructions executable by the one or more processor via the memory to perform a method. The method can include for example: obtaining one or more vehicle parameter of first and second moving vehicles; processing the one or more vehicle parameter of first and second moving vehicles to determine rendezvous point information; outputting data of the rendezvous point information to the first and second moving vehicles; and repeating the obtaining, the processing and the outputting.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
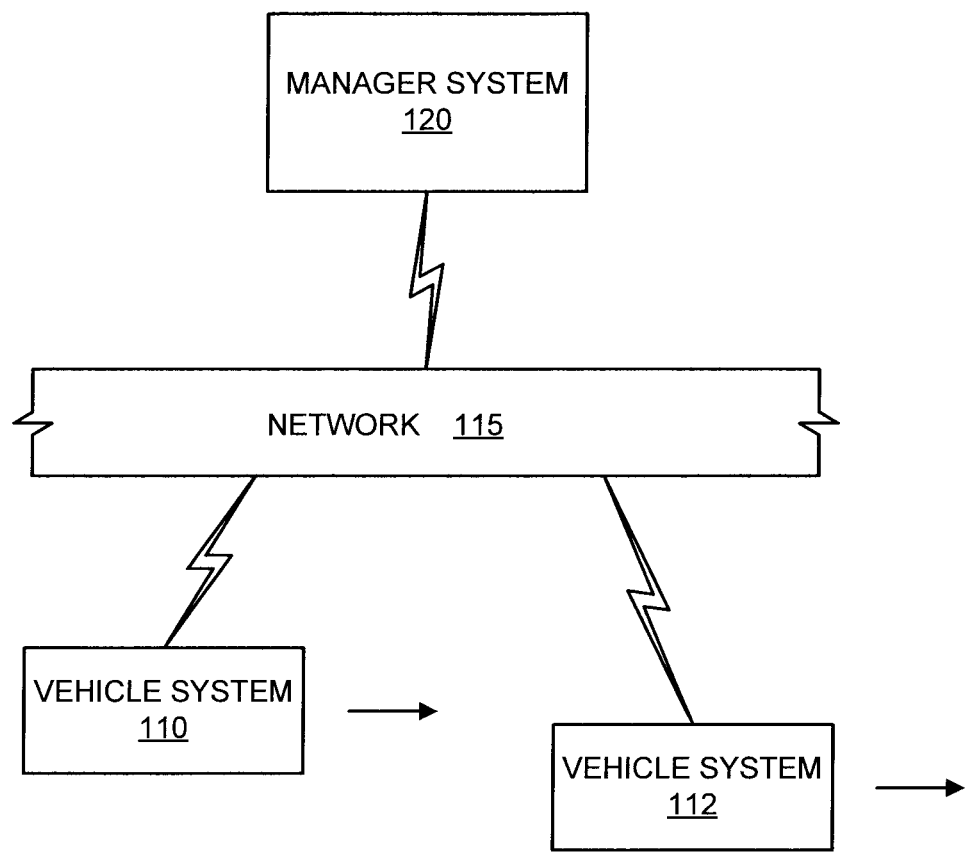
FIG. 1 depicts a system having a first vehicle system, a second vehicle system and a manager system in one embodiment.

An overview of a system 100 is shown in FIG. 1. System 100 can include first vehicle system 110 second vehicle system 112 and manager system 120 connected to first vehicle system 110 and second vehicle system 112 by a network 115. First vehicle system 110 and second vehicle system 112 can be computing node based systems of respective moving vehicles. In one embodiment the respective moving vehicles and be autonomous vehicles. Manager system 120 can be a computing node based system operative to obtain one or more vehicle parameter from first vehicle system 110 and second vehicle system 112. Based on the one or more vehicle parameter, manager system 120 can determine rendezvous point information, and can output the rendezvous point information to the first and second vehicle systems 110 and 112. In one embodiment, network 402 may be a physical network or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network. Vehicle system 110 and vehicle system 112 can be connected to network 115 via respective wireless communication links such as Wide area Network (WAN), e.g. cellular based wireless communication links.

Figure 6:
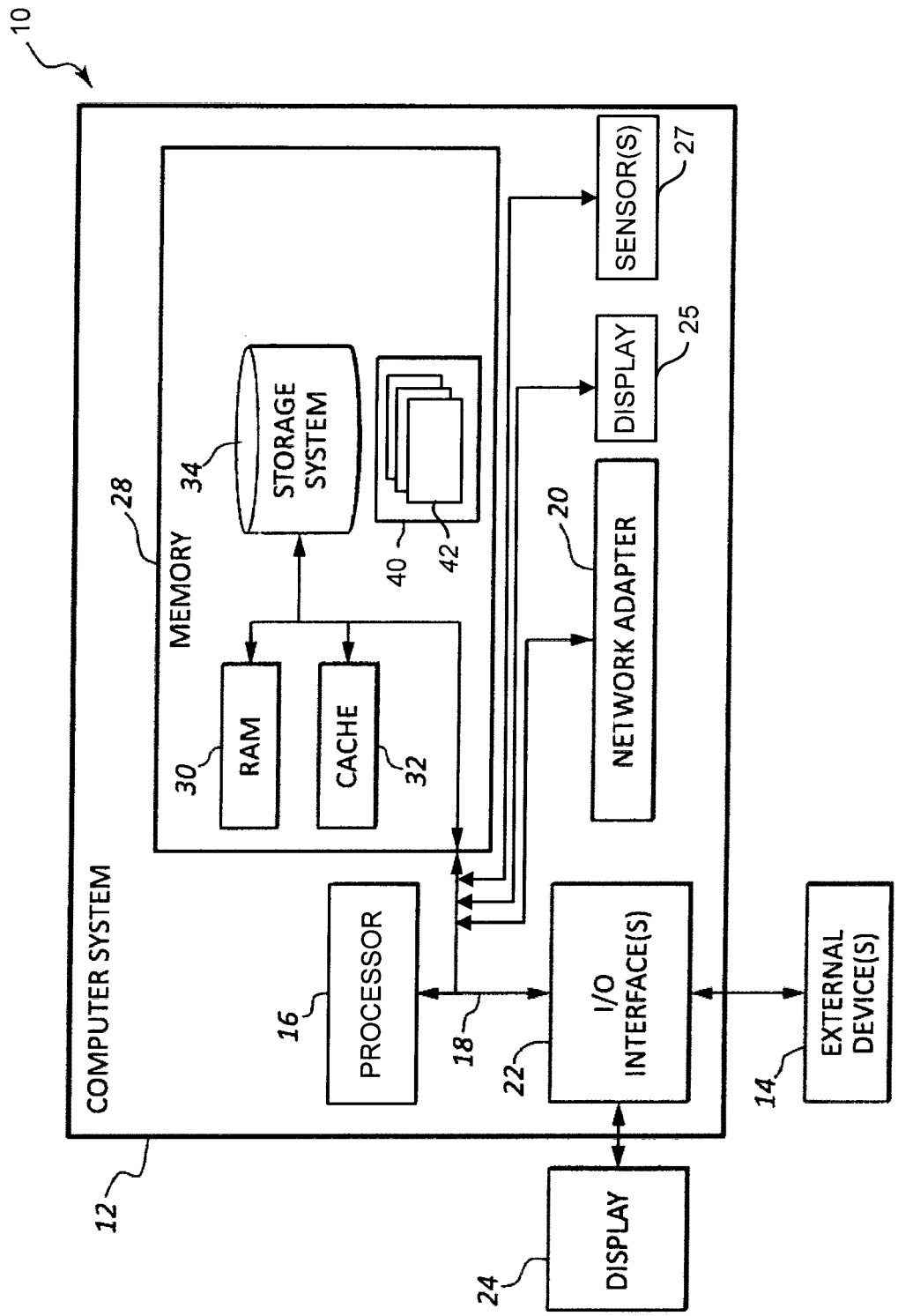
FIG. 6 depicts a computing node in one embodiment.

In one embodiment, each of first vehicle system 110 second vehicle system 112 and manager system 120 can include one or more computing node 10 as set forth herein in connection with FIG. 6. Manager system 120 is depicted in FIG. 1 as being located external to vehicle system 110 and vehicle system 112; however, manager system 120 can alternatively be co-located with one or more or vehicle system 110 or vehicle system 112.

A method 200 that can be performed by manager system 120 in one embodiment is illustrated with reference to FIG. 2. At block 210 method 200 can include obtaining one or more vehicle parameter of first and second moving vehicles. At block 220 method 200 can include processing the one or more vehicle parameter to determine rendezvous point information. At block 230 method 200 can include outputting data of the rendezvous point information to the first vehicle and the second vehicle for use by the first vehicle and the second vehicle. At block 240 the method 200 can include repeating the obtaining, processing, and the outputting.

In one embodiment, the obtaining one or more vehicle parameter at block 210 can include e.g. obtaining one or more of a current route information, current location information or current speed information of a vehicle.

In one embodiment, determining rendezvous point information can include e.g. determining trajectory information for the first and second vehicle, e.g. including one or more or route information or speed information for achieving a rendezvous point at which first and second moving vehicles can rendezvous. In one embodiment, determining rendezvous point information at block 220 can include determining location coordinates defining a rendezvous point.

In one embodiment, at block 230 outputting data of the rendezvous point information can include e.g. outputting one or more of route information, speed information or location coordinates as determined at block 220.

In one embodiment, repeating the obtaining, processing and outputting at block 240 can include repeating the obtaining, processing, and outputting until a condition is satisfied. An example of a condition that can be satisfied is that the first vehicle and the second vehicle are at matching locations. A matching condition can be determined based on a matching criteria. Embodiments herein recognize that a number of factors, e.g. traffic conditions including accidents, road conditions and weather can affect a course of a vehicle and result in a delay of a vehicle reaching a rendezvous point, or a vehicle reaching a rendezvous point sooner than anticipated of not being able to reach a rendezvous point at all. By providing system 100 so that a rendezvous point is repeatedly negotiated, system 100 is able to guide moving vehicles to meet at a rendezvous point notwithstanding a variety of changing conditions, e.g. traffic conditions including accidents, weather and road conditions. Repeating at block 240 can be performed e.g. continuously or intermittently. Obtaining, processing and outputting at block 240 can per performed e.g. for at least one iteration in one embodiment; at least 2 iterations in one embodiment; at least 5 iterations in one embodiment; at least 10 iterations in one embodiment; at least 50 iterations in one embodiment; at least 100 iterations in one embodiment; at least 500 iterations in one embodiment; at least 1000 iterations in one embodiment; at least 10K iterations in one embodiment; at least 100K iterations in one embodiment; at least 1M iterations in one embodiment.

Figure 3:
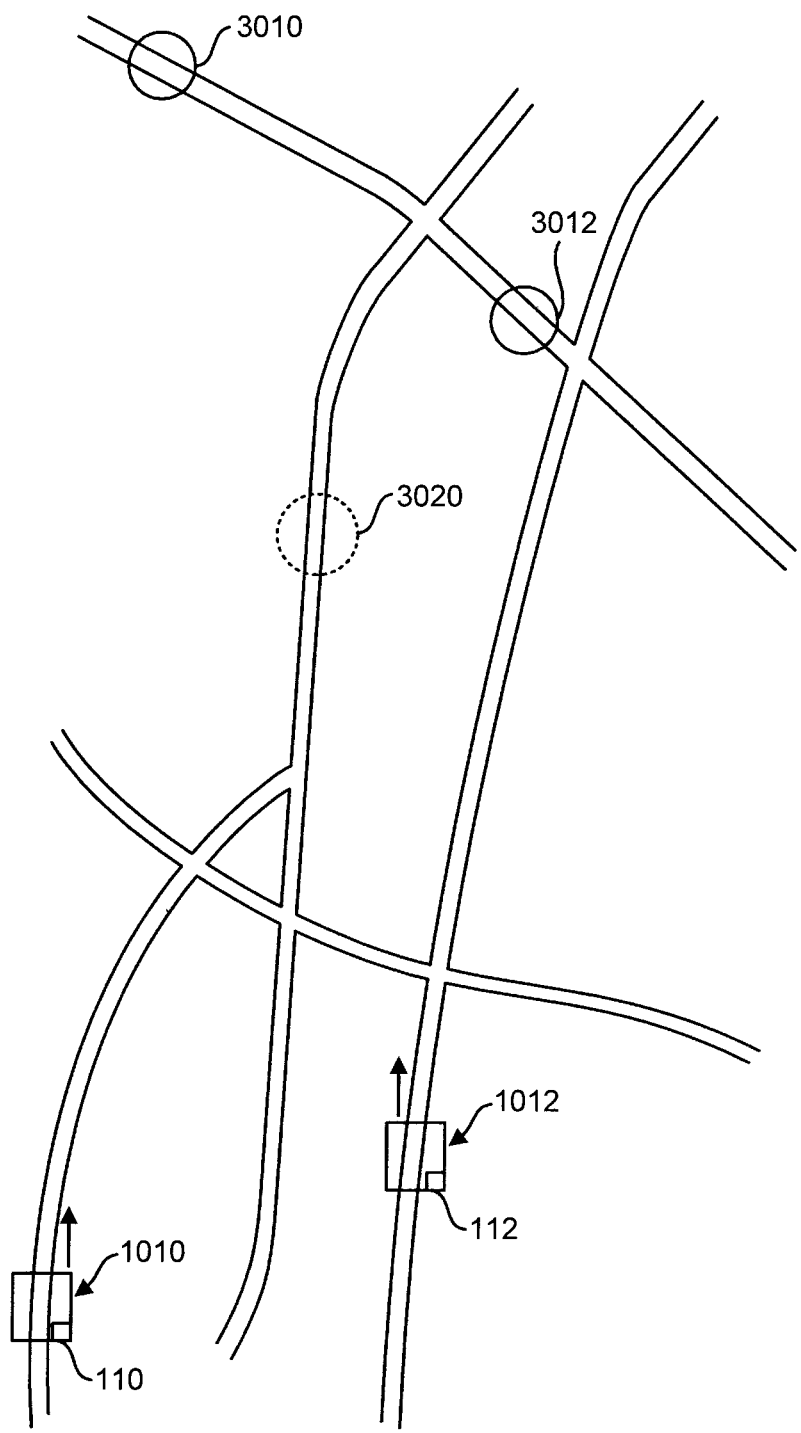
FIG. 3 is a road map illustrating operation of a system in one embodiment.

FIG. 3 illustrates a road map that highlights various features as set forth herein. Referring to FIG. 3, the first vehicle 1010 can be travelling along a first route and can have destination 3010, the second vehicle 1012 can be travelling along second route and can have destination 3012. First vehicle 1010 can have first vehicle system 110 supported thereon and second vehicle 1012 can have second vehicle system 112 supported thereon. In one embodiment, communications can be commenced e.g. with or without the intermediary of manager system 120 facilitating a meeting between first moving vehicle 1010 and second moving vehicle 1012 each of which can be autonomous moving vehicles. As set forth herein, a rendezvous point 3020 can be determined. Rendezvous point 3020 can be a repeatedly updated rendezvous point.

Still referring to the road map at FIG. 3 it is anticipated that when a rendezvous has occurred (i.e. first and second vehicles are at a matching location according to a certain matching criteria) coupling procedures can be performed so that the first and second moving vehicles can be mechanically coupled together. The mechanical coupling of the vehicles together can facilitate a service. For example in one embodiment second vehicle 1012 can be a pizza delivery vehicle and can deliver pizza to passengers in first vehicle 1010 on being coupled to first vehicle 1010. In one embodiment second vehicle 1012 can be a fuel delivery vehicle and can deliver fuel to first vehicle 1010 on being mechanically coupled to first vehicle 1010.

Figure 4A:
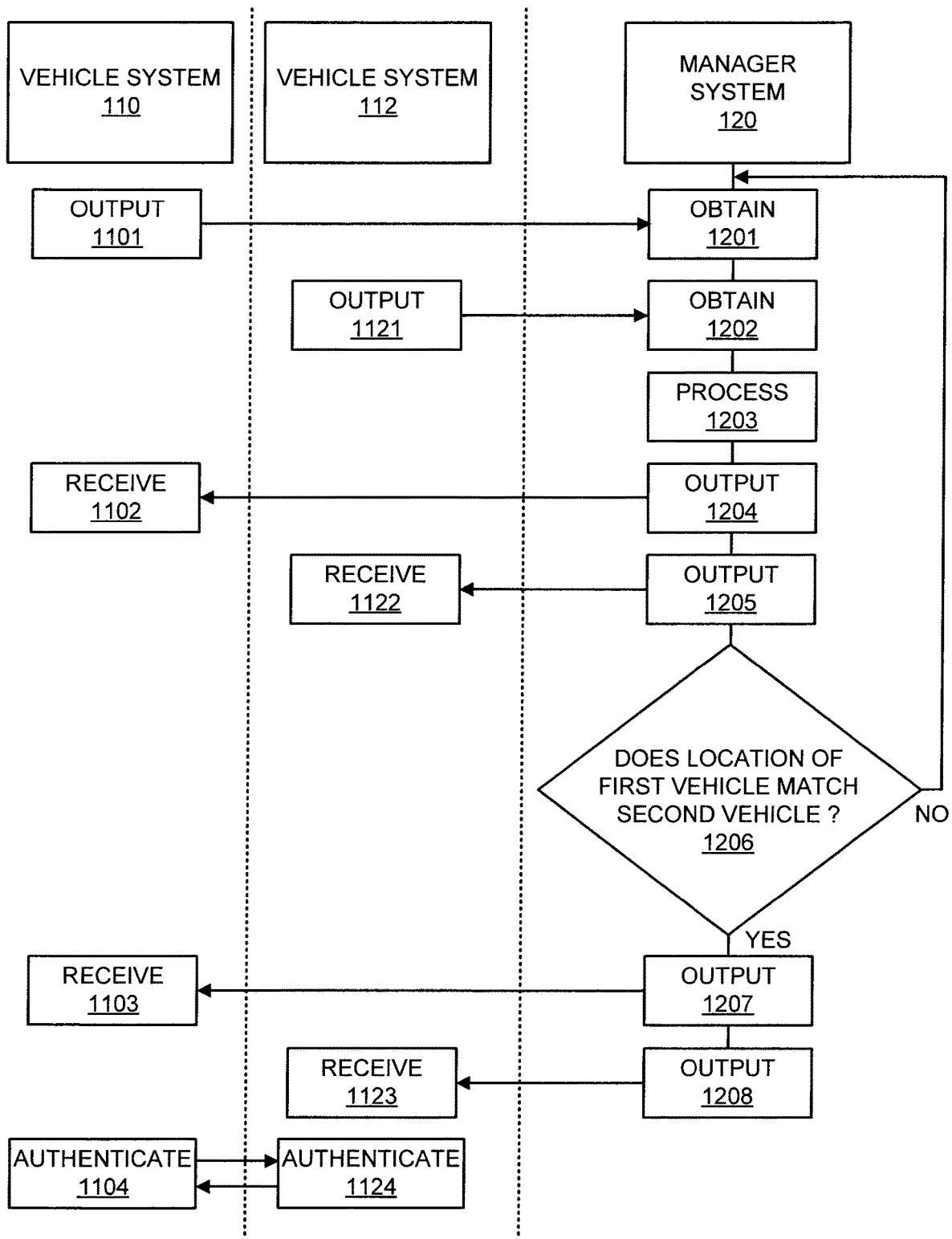
FIG. 4A-4B is a flowchart depicting operation of a first vehicle system a second vehicle system and a manager system in one embodiment.
Figure 4B:
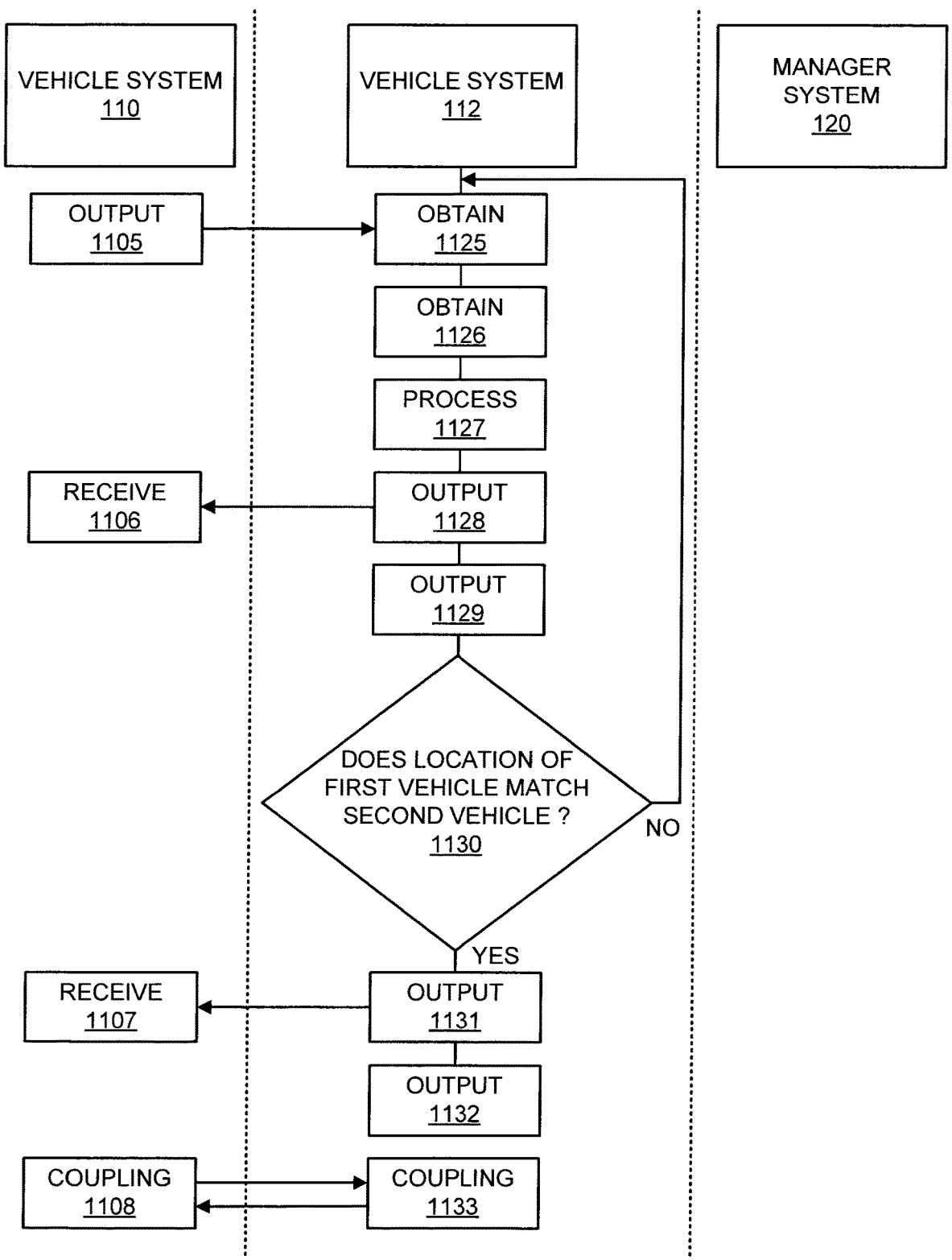

A flowchart illustrating operation of system 100 in one embodiment is shown in FIG. 4A-4B, wherein exemplary functions are described with respect to vehicle system 110, vehicle system 112 and manager system 120. In one embodiment manager system 120 can be external to each of vehicle system 110 and vehicle system 112 and vehicle system 112 can be external to vehicle system 110.

Referring to the flowchart of FIG. 4A-4B vehicle system 110 at block 1101 can output one or more vehicle parameter and manager system 120 can obtain the one or more vehicle parameter at block 1201. At block 1121 vehicle system 112 can output one or more vehicle parameter and manager system 120 can obtain one or more vehicle parameter at block 1202. At block 1203 manager system 120 can perform processing of the one or more vehicle parameter obtained from vehicle system 110 at block 1201 and from vehicle system 112 at block 1202. Based on the processing manager system 120 can determine rendezvous point information. At block 1204 manager system 120 can output data of the rendezvous point information to vehicle system 110 which can receive the data of rendezvous point information at block 1102. At block 1205 manager system 120 can output data of rendezvous point information to vehicle system 112 which can receive the data of the rendezvous point information at block 1122.

In one embodiment owner users of vehicle system 110 and vehicle system 112 can be registered users of manager system 120 and identifying information of vehicle system 110 and vehicle system 112 can be registered with manager system 120 as part of a registration process which owner users of vehicle system 110 and vehicles system 112 become registered users. As part of a registration process manager system 120 can share security information with vehicle system 110 and 112 which when returned to manager system 120 by vehicle system 110 and 112 allows manager system 120 to authenticate vehicle system 110 and vehicle system 112. At block 1101 prior to outputting one or more vehicle parameter vehicle system 110 can output a digital certificate based on the security information previously received from manager system 120 and manager system 120 can authenticate vehicle system 110 based on the digital certificate. Based on the performed authentication manager system 120 can transmit a secure key to vehicle system 110 for use by vehicle system 110 in encrypting messages to manager system 120 and decrypting messages from manager system 120. At block 1121 prior to outputting one or more vehicle parameter vehicle system 112 can output a digital certificate based on the security information previously received from manager system 120 and manager system 120 can authenticate vehicle system 112 based on the digital certificate. Based on the performed authentication manager system 120 can transmit a secure key to vehicle system 112 for use by vehicle system 112 in encrypting messages to manager system 120 and decrypting messages from manager system 120. Secure communication channels can thus be provided between manager system 120 and vehicle system 110 and between manager system 120 and vehicle system 112.

In one embodiment at block 1101 vehicle system 110 can request a service delivery for in transit delivery of a product, e.g. a pizza or fuel. In response to receipt of the request at block 1201 can locate a vehicle in a vicinity of vehicle having system 110 for performance of the service. In the embodiment described in the flow diagram of FIG. 4A-4B, manager system 120 can identify vehicle having vehicle system 112 as a vehicle for performance of the service.

In one embodiment, one or more vehicle parameter output at block 1101 and block 1121 can include e.g. one or more of current route information, current speed information, or current location information.

In one embodiment, processing at block 1203 can include processing to determine rendezvous point information provided by trajectory information e.g. including one or more of vehicle speed information or route information. Processing by manager system 120 to determine rendezvous point information can include (a) identifying candidates routes for the first and second moving vehicles in which the vehicles may rendezvous; (b) determining candidate rendezvous points based on the candidate routes, (c) for each of the candidate rendezvous points and for each of several candidate rendezvous times associated with each candidate rendezvous points, (d) determining a candidate route and speed datasets for each of the first vehicle moving and the second moving vehicle; (e) scoring each candidate route and speed dataset according to a scoring function; and (f) selecting the rendezvous point and time yielding the highest score for the first and second moving vehicle as the determined rendezvous point and time. Manager system 120 can select the first and second vehicle candidate route and speed datasets yielding the highest score as the determined vehicle trajectories (including e.g. one or more of route information or speed information) for the first and second moving vehicles.

In accordance with the processing at block 1203 rendezvous point information output at block 1204 and block 1205 can include trajectory information, including e.g. one or more of route information or speed information. On receipt of the rendezvous point information at block 1102 where the rendezvous point information has trajectory information including one or more of route information or speed information vehicle system 110 can update its current route and speed (controlling speed of the first vehicle) according to the received trajectory information. On receipt of the rendezvous point information at block 1122 where the rendezvous point information has trajectory information including e.g. one or more of route information or speed information vehicle system 112 can update its current route and speed (controlling speed of the second moving vehicle) according to the received trajectory information.

At block 1206, manager system 120 can determine whether a location of a first moving vehicle having vehicle system 110 matches a location of a second moving vehicle having vehicle system 112. If the locations match, manager system 120 can proceed to block 1207 and block 1208. If the locations do not match, manager system 120 can repeat blocks 1201-1205. For performing matching manager system 120 can determine whether locations are matching according to a matching criteria. For performing matching manager system 120 can use a matching criteria that employs a threshold distance. In one embodiment, manager system 120 can determine that locations are matching if they are within a threshold distance of one another. The threshold distance can be e.g. predetermined or dynamically determined based on e.g. network signal strengths of candidate wireless networks to which the first vehicle system 110 and/or second vehicle system 112 may connect. For performing matching manager system 120 can use a matching criteria that employs one or more pattern recognition process, e.g., including one or more of classification algorithms or clustering algorithms.

At block 1207 and block 1208 responsively to determining that a location of a first moving vehicle having vehicle system 110 matches a location of a second moving vehicle having vehicle system 112 manager system 120 can output respective messages to vehicle system 110 and vehicle system 112 which can be received respectively at block 1103 and block 1023. In one embodiment such messages can include content triggering a handoff of a performance of method 200 as set forth in FIG. 2 from manager system 120 to one or more of vehicle system 110 or vehicle system 112.

Figure 2:
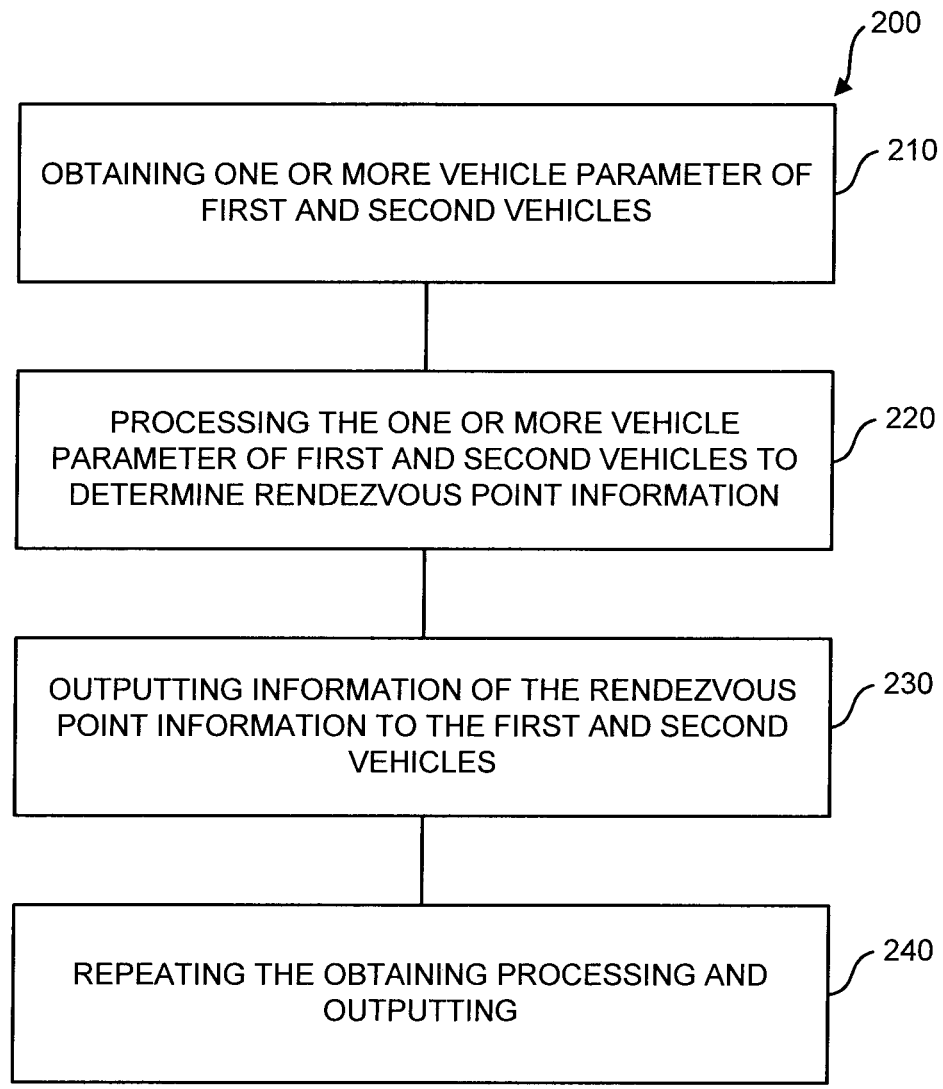
FIG. 2 is a flowchart depicting operation of a manager system in one embodiment.

Embodiments herein recognize that it can be advantageous to employ an external computing node based system such as may be provided by manager system 120 for performance of the method 200 as set forth in FIG. 2, e.g. performance of blocks 1201-1206 by manager system 120 can be regarded as example of performance of method 200 in one embodiment. Employing an external computing node based system can offload processing resources which may be useful for e.g. navigational control or passenger services. Employing an external computing node based system can also be advantageous in terms of assuring network connectivity. Employing an external computing node based system can also be advantageous in terms of assuring network connectivity. Employing an external computing node based system can also be advantageous in terms of assuring secure communications. For example as set forth herein vehicle system 110 and 112 can be authenticated to manager system 120 based on previously received security information received by vehicle system 110 and vehicle system 112 from manager system 120.

Embodiments herein also recognize that it can be advantageous to employ one or more of vehicle system 110 or vehicle system 112 and point to point communications between vehicle system 110 and vehicle system 112 for performance of method 200 as set forth in FIG. 2. Embodiments herein recognize for example that point to point communications between vehicle system 110 and vehicle system 112 may provide reductions in latency and that latency reductions can become more important as vehicles are in close range when lapses in communication can have a greater effect (in terms of percentages of distances between vehicles) on the performance of routing first and second moving vehicles toward one another. Embodiments herein recognize that advantages can be yielded by providing a handoff of performance of method 200 between manager system 120 and one or more of vehicle system 110 or vehicle system 112. For example, by performance of method 200 initially by manager system 120 manager system 120 which can implement secure channel communications between manager system 120 and each of vehicle system 110 and vehicle system 112 can distribute security information to vehicle system 110 and vehicle system 112 that facilitates vehicle system 110 and vehicle system 112 authenticating each other for supporting of secure channel point to point communications between vehicle system 110 and vehicle system 112 using e.g. dedicated short range communications (DSRC).

Referring again to the flow diagram of FIGS. 4A-4B messages output and block 1207 and block 1208 for triggering a handoff of can include security information that facilitates vehicle system 110 and vehicle system 112 performing secure channel point to point communications between vehicle system 110 and vehicle system 112. At block 1207 manager system 120 can output for receipt by vehicle system 110 at block 1103 security information through the established secure communication channel between manager system 120 and vehicle system 110 that allows vehicle system 110 to authenticate vehicle system 112. Such security information can include e.g. identifying information of vehicle system 112 that has been registered in manager system 120 in a manner as set forth herein. At block 1208 manager system 120 can output for receipt by vehicle system 112 at block 1123 security information through the secure communication channel established between manager system 120 and vehicle system 112 that allows vehicle system 112 to authenticate vehicle system 110. Such security information can include e.g. identifying information of vehicle system 110 that has been registered in manager system 120 in a manner as set forth herein. In one embodiment, based on the security information received and responsive to receipt of messages at blocks 1104 and 1124 vehicle system 110 and vehicle system 112 can authenticate each other, e.g. vehicle system 110 can authenticate vehicle system 112 based on an examination of a digital certificate received from vehicle system 112 and vehicle system 112 can authenticate vehicle system 111 based on an examination of a digital certificate received from vehicle system 110. Based on a performed authentication by vehicle system 110 vehicle system 110 can transmit a secure key to vehicle system 112 for use by vehicle system 112 in encrypting messages to and decrypting messages from vehicle system 110. Based on a performed authentication by vehicle system 112 vehicle system 112 can transmit a secure key to vehicle system 110 for use by vehicle system 110 in encrypting messages to and decrypting messages from vehicle system 112. Vehicle system 110 and vehicle system 112 can thus be configured to perform point to point secure channel communication so as to prevent unscrupulous third parties e.g. from intercepting a delivery order.

Further responsive to receipt of messages at blocks 1103 and 1123, one or more of vehicle system 110 or vehicle system 112 can initiate continued performance of method 200 as set forth in FIG. 2 for completion of a handoff of performance of method 200 between vehicle system 110 and vehicle system 112. In the embodiment described with reference to the flowchart of FIGS. 4A and 4B blocks 1125-1130 illustrate an embodiment of a performance of method 200 as performed by vehicle system 112.

Referring to the flowchart of FIG. 4A-4B vehicle system 110 at block 1105 can output one or more vehicle parameter and vehicle system 112 can obtain the one or more vehicle parameter at block 1125. At block 1126 vehicle system 112 can obtain one or more vehicle parameter of vehicle system 112. At block 1127 vehicle system 112 can perform processing of the one or more vehicle parameter obtained from vehicle system 110 at block 1125 and from vehicle system 112 at block 1126. Based on the processing vehicle system 112 can determine rendezvous point information. At block 1128 vehicle system 112 can output data of the rendezvous point information to vehicle system 110 which can receive the data of rendezvous point information at block 1106. At block 1129 vehicle system 112 can output data of rendezvous point information to vehicle system 112 which can obtain the data of the rendezvous point information at block 1129. In one embodiment, one or more vehicle parameter output obtained at block 1125 and block 1126 can include e.g. one or more of current route information, current speed information, or current location information.

In one embodiment, processing at block 1127 can include processing to determine rendezvous point information provided by trajectory information e.g. including one or more of vehicle route information or speed information. Processing by manager system 120 to determine rendezvous point information can include (a) identifying candidates routes for the first and second moving vehicles in which the vehicles may rendezvous; (b) determining candidate rendezvous points based on the candidate routes, (c) for each of the candidate rendezvous points and for each of several candidate rendezvous times associated with each candidate rendezvous points, (d) determining a candidate route and speed datasets for each of the first moving vehicle and the second moving vehicle; (e) scoring each candidate route and speed dataset according to a scoring function; and (f) selecting the rendezvous point and time yielding the highest score for the first and second moving vehicle as the determined rendezvous point and time. Vehicle system 112 can select the first and second vehicle candidate route and speed datasets yielding the highest score as the determined vehicle trajectories (including e.g. one or more of route information or speed information) for the first and second moving vehicles.

In accordance with the processing at block 1127 rendezvous point information output at block 1128 and 1129 can include trajectory information, including e.g. one or more of route information or speed information. On receipt of the rendezvous point information at block 1106 where the rendezvous point information has trajectory information including one or more of route information or speed information vehicle system 110 can update its current route and speed (controlling speed of the first vehicle) according to the received trajectory information. On obtaining of the rendezvous point information at block 1129 where the rendezvous point information has trajectory information including e.g. one or more of route information or speed information vehicle system 112 can update its current route and speed (controlling speed of the second moving vehicle) according to the received trajectory information.

In one embodiment, rendezvous point information output at block 1128 and 1129 can be differentiated from rendezvous point information output at block 1204 and 1206. Embodiments herein recognize that it may be advantageous to include more specific route information when vehicles are closer together in anticipation of the vehicles potentially being subject to a coupling processes wherein the vehicles can be mechanically coupled. In one embodiment route information that can be output at block 1128 and block 1129 can include information in addition to route information which can be output at block 1204. For example route information output at block 1128 and 1129 can include such route information as lane control information for assuring that the first and second moving vehicles are in a common lane, order control information for assuring that the vehicles are in a certain order (first moving vehicle in front of second moving vehicle or vice versa) and/or adjacency control information for assuring that there are no intervening vehicles between the first vehicle and the second moving vehicle.

At block 1130, vehicle system 112 can determine whether a location of a first moving vehicle having vehicle system 110 matches a location of a second moving vehicle having vehicle system 112. If the locations match, vehicle system 112 can proceed to block 1131 and block 1132. If the locations do not match, vehicle system 112 can repeat blocks 1125-1129. For performing matching vehicle system 112 can determine whether locations are matching according to a matching criteria. For performing matching vehicle system 112 can use a matching criteria that employs a threshold distance. In one embodiment, vehicle system 112 can determine that locations are matching if they are within a threshold distance of one another. The threshold distance can be e.g. predetermined or dynamically determined based on e.g. network signal strengths of candidate wireless networks to which the first vehicle system 110 and/or second vehicle system 112 may connect. For performing matching manager system 120 can use a matching criteria that employs one or more pattern recognition process, e.g., including one or more of classification algorithms or clustering algorithms.

A location matching criteria employed by vehicle system 112 can block 1130 can be differentiated from a location matching criteria employed by manager system 120 at block 1206. For example a threshold distance used for performing matching can be less for performance of matching at block 1130 than for performance of matching at block 1206. A predetermined or dynamically determined threshold distance can be e.g. 100 feet or 500 feet for performance of matching at block 1130 and for performance of matching at block 1206 can be e.g. 0.5 miles or 1.0 mile. Embodiments herein recognize that at shorter distances between vehicles a first moving vehicle may be within a line of sight of a second moving vehicle. In one embodiment a matching criteria employed at block 1130 can include the criteria that a first vehicle is detected, e.g. using pattern recognition, by a machine vision system of the second vehicle system 112. In one embodiment a matching criteria employed at block 1130 can include the criteria that (a) a first vehicle is detected, e.g. using pattern recognition, by a machine vision system of the second vehicle system 112, (b) the first vehicle and the second vehicle are in a common lane, (c) the first moving vehicle and second moving vehicle are in a prescribed order, and/or (d) the first moving vehicle and the second moving vehicle are adjacent to one another.

At block 1131 and 1132 responsively to determining at block 1130 that a location of a first vehicle matches a location of a second vehicle system 112 can output messages to vehicle system 110 and vehicle system 112 which can be obtained respectively at block 1107 and block 1132. In one embodiment such messages can be simple messages to indicate that a matching condition has occurred.

In response to receipt of a matching condition message, first vehicle system 110 and second vehicle system 112 can perform a coupling process at blocks 1108 and 1133. When the first moving vehicle and the second moving vehicle are sufficiently close together vehicle system 110 and vehicle system 112 can manage coupling of the vehicles using computer machine vision systems of the vehicle systems 110 and 112 in addition to positioning systems. For performance of mechanical coupling, first and second moving vehicles can be configured so that vehicle steering, speed as well as mechanical couplers of the vehicles can be configured to be under servo-control of respective computer machine vision systems of the respective first and second vehicle systems 110 and 112 of the respective first and second moving vehicles. First vehicle system 110 and second vehicle system 112 can perform servo-control of vehicle steering speed and mechanical couplers of their respective first and second moving vehicles at blocks 1108 and 1133 until mechanical coupling is achieved. A delivery service can then be completed, e.g. for delivery of a product such as a pizza or fuel.

Figure 5:
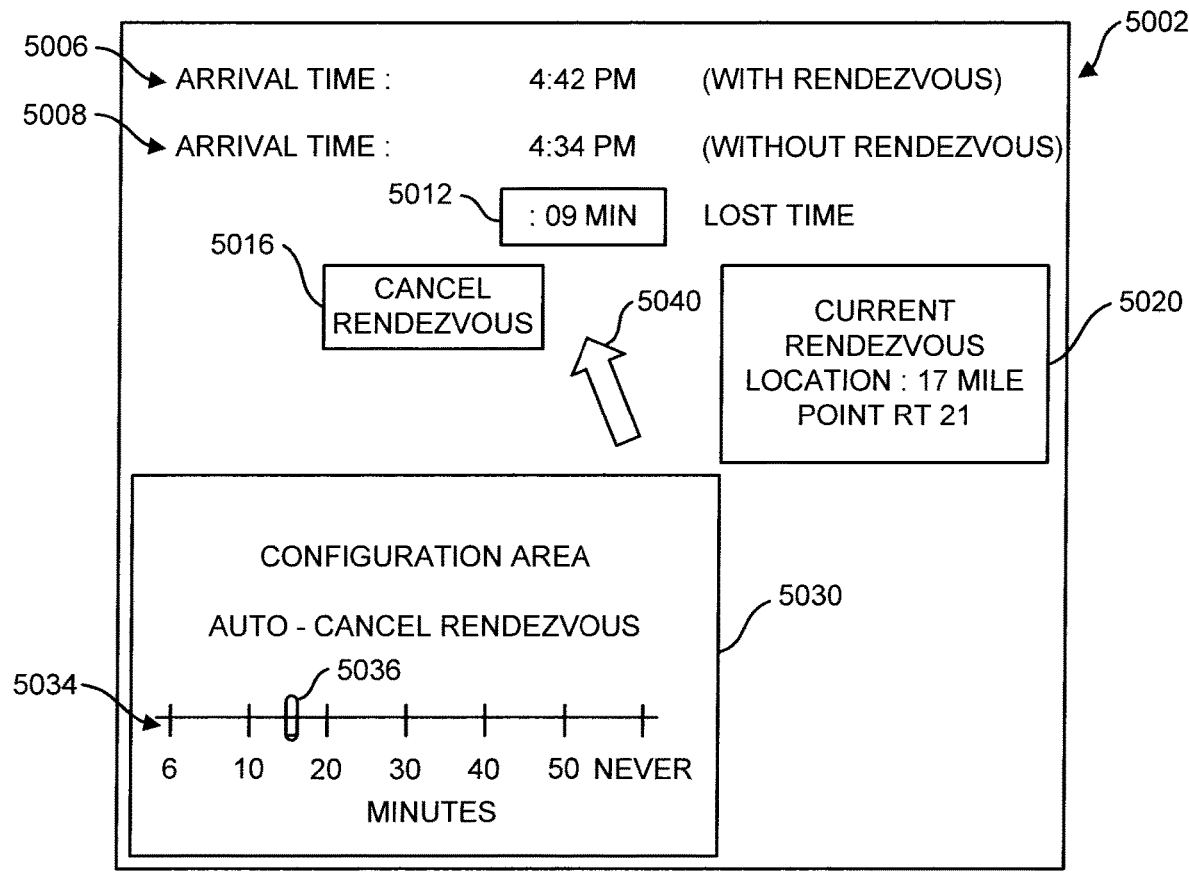
FIG. 5 is an example of an output user interface in one embodiment.

A user interface 5002 that can be output by system 100 is shown in FIG. 5. 5002. User interface 5002 can be a displayed on or more computing node display of system 100, e.g. a computing node of one or more of vehicle system 110, 112 and manager system 120. User interface 5002 can display useful information on a route being performed by a vehicle for travelling to a rendezvous point for meeting another vehicle. At area 5006 an arrival time with the current rendezvous can be displayed. At area 5008 an arrival time without the current rendezvous can be displayed. At area 5012 a time difference (with our without the rendezvous) can be displayed. At area 5020 user interface 5002 can display data of a current rendezvous point. With processing to determine rendezvous point information being repeatedly updated, information displayed in area 5006, area 5008, area 5012, and area 5020 can be repeatedly updated. A user observing user interface 5002 can observe the status data of one or more of area 5006, 5008, 5012, and 5020 and based on the observation may decide to cancel a current rendezvous using tool 040 and button 5016. For example if a delay attendant to a rendezvous is too long a user may cancel a rendezvous. At area 5030 a user can establish configuration settings. For example using tool 5040 and sliding button 5036 a user can set a delay time after which a rendezvous will be automatically cancelled.

Certain embodiments herein may offer various technical computing advantages, including providing for updating of e.g. routes of moving vehicles so that first and second moving vehicles can rendezvous at a rendezvous point. A manager system which can be external to first and second vehicle systems of first and second moving vehicles can perform obtaining vehicle data of first and second moving vehicles having computing node based vehicle systems over a computer network, perform processing the vehicle data for determining rendezvous point information and can perform outputting data of the rendezvous point information to the first and second moving vehicles. The manager system can repeatedly perform the obtaining, processing and outputting so that updated data of rendezvous point information can be repeatedly output to the first and second moving vehicles. The above method including obtaining processing outputting and repeating can be performed in additionally or alternatively by a vehicle system in point to point communication with another vehicle system, and in one embodiment the above method can include hand off of performance of the method from a manager system to a vehicle system. A method can include provisions so that secure communication channels can be established between a management system and vehicle systems and/or between vehicle systems in point to point communication with one another. A rendezvous can be facilitated between vehicles such as moving autonomous vehicles notwithstanding changing conditions such as changing traffic conditions, weather conditions and road conditions.

Figure 7:
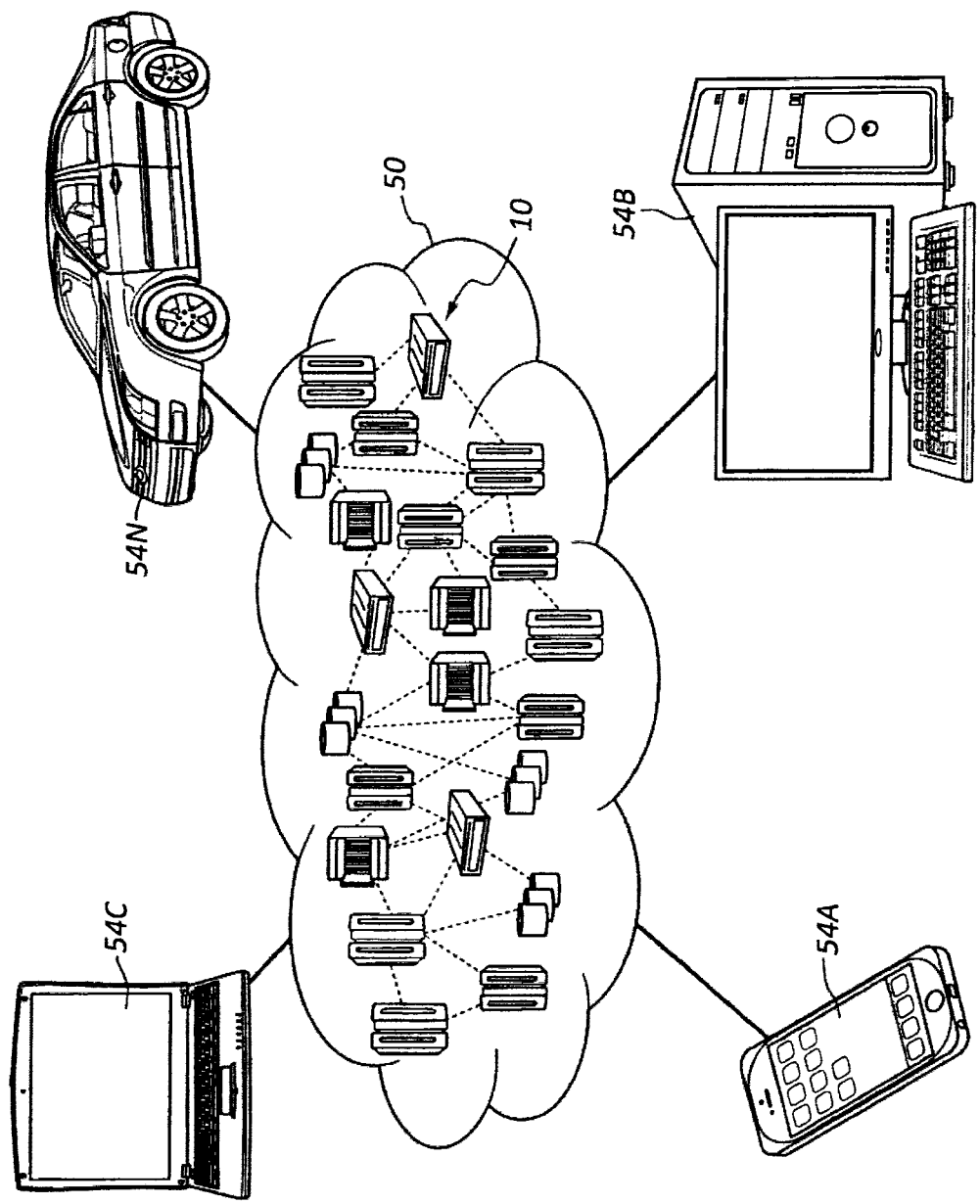
FIG. 7 depicts a cloud computing environment in one embodiment.
Figure 8:
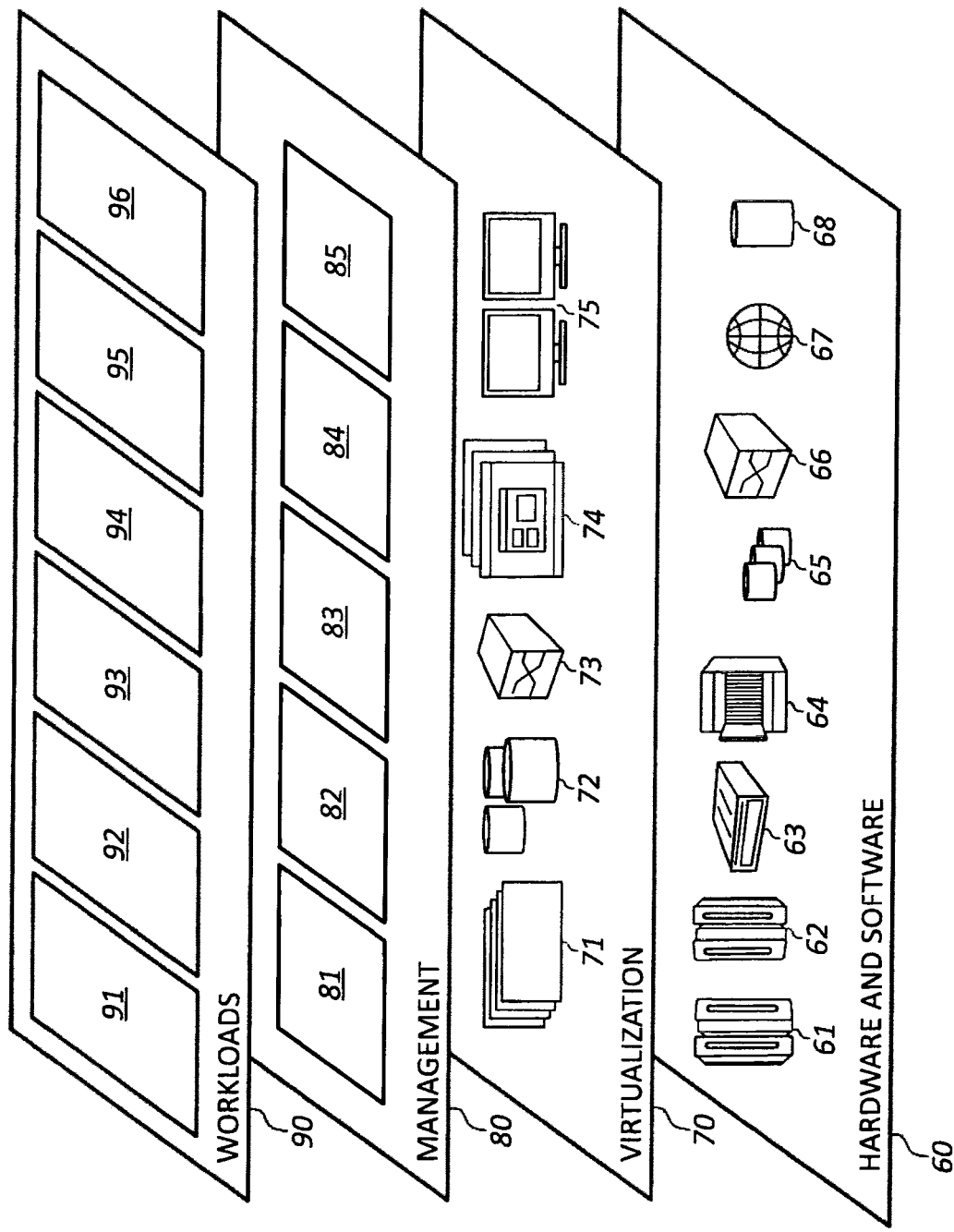
FIG. 8 depicts abstraction model layers in one embodiment.

FIGS. 6-8 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment. Each of vehicle system 110, vehicle system 112, and manager system 120 as set forth in FIG. 1 can include one or more computing node.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 6, computer system 12 in computing node 10 is shown in the form of a general-purpose computing device. The components of computer system 12 may include, but are not limited to, one or more processor 16, a system memory 28, and a bus 18 that couples various system components including system memory 28 to one or more processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein e.g. the functions set forth with reference to the flowchart of FIG. 2 which can be performed by manager system 120, and the functions of vehicle system 110, vehicle system 112, and manager system 120 described with reference to the flowchart of FIG. 4A-4B. In one embodiment, a first one or more program 40 can be stored in one or more computer node memory of manager system 120 for providing described functions of manager system 120, and a second one or more program 40 can be stored in one or more computer node memory of each vehicle system 110, 112 for providing described functions of each vehicle system 110, 112.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., or more of a camera, a gyroscope, a temperature sensor, a humidity sensor or an audio input device. Computer system 12 can include one or more network adapter 20. In reference to FIG. 7 below computing node 10 is implemented in a cloud environment and hence is referred to as a cloud computing node in the context of FIG. 7. Where computing node 10 is included in a vehicle system 110 or 112 coordinate location information of the vehicle system can be provided by a GPS device included in one or more sensor device 27.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 8) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for performing methods for vehicle routing which methods can include determining vehicle rendezvous point information as set forth herein e.g. in connection with the flowcharts of FIG. 2 and FIG. 4A-4B. The processing components 96 can be performed by one or more program 40 described in FIG. 6.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. Where methods, computer program products, or systems are described as having a certain number of elements, the methods, computer program products, or systems can be practiced with less than or greater than the certain number of elements. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
    obtaining, by one or more processor, one or more vehicle parameter of first and second moving vehicles;
    processing, by the one or more processor, the one or more vehicle parameter of first and second moving vehicles to determine rendezvous point information;
    outputting, by the one or more processor, data of the rendezvous point information to the first and second moving vehicles; and
    repeating, by the one or more processor, the obtaining, the processing and the outputting, wherein the obtaining, processing, outputting and repeating includes performing the obtaining, processing, outputting and repeating by a computing node based system external to the first moving vehicle and the second moving vehicle, and handing off the performing of the obtaining, processing, outputting and repeating for performance by a computing node based system located on one or more of the first moving vehicle or second moving vehicle, wherein the handing off is responsive to a determination that the first moving vehicle and second moving vehicle are at matching locations according to a matching criteria, the matching criteria including the criteria that the first moving vehicle and the second moving vehicle are within a threshold distance of one another.

2. The method of claim 1, wherein the method includes determining whether a location of the first moving vehicle matches a location of the second moving vehicle according to a matching criteria, and wherein the repeating is performed if according to the determining the location of the first moving vehicle does not match a location of the second moving vehicle.

3. The method of claim 1, wherein the obtaining, the processing and the outputting are performed by a computing node based system that is external to the first moving vehicle and the second moving vehicle.

4. The method of claim 1, wherein the obtaining, the processing and the outputting are performed by one or more of the following selected from the group consisting of the first moving vehicle and the second moving vehicle.

5. The method of claim 1, wherein the rendezvous point information includes trajectory information, the trajectory information including route information and speed information.

6. The method of claim 1, wherein the outputting includes outputting one or more of the following selected from the group consisting of route information, speed information, and rendezvous point location information.

7. The method of claim 1, wherein the one or more vehicle parameter includes one or more of the following selected from the group consisting of current route information, current speed information and current location information.

8. The method of claim 1, wherein one or more of the first moving vehicle or the second moving vehicle is an autonomous vehicle.

9. The method of claim 1, wherein each of the first moving vehicle and the second moving vehicle is an autonomous vehicle.

10. The method of claim 1, wherein the obtaining, processing, outputting and repeating includes performing the obtaining, processing, outputting and repeating by a computing node based system external to the first moving vehicle and the second moving vehicle, and handing off the performing of the obtaining, processing, outputting and repeating for performance by a computing node based system located on one or more of the first moving vehicle or second moving vehicle.

11. The method of claim 1, wherein the obtaining, processing, outputting and repeating includes performing the obtaining, processing, outputting and repeating by a computing node based system located on one or more of the first moving vehicle or second moving vehicle, wherein the method includes performing one or more secure key exchange between the first moving vehicle and the second moving vehicle, and wherein the method includes using point to point communications between the first moving vehicle and the second moving vehicle.

12. The method of claim 1, wherein the obtaining, processing, outputting and repeating includes performing the obtaining, processing, outputting and repeating by a computing node based system located on one or more of the first moving vehicle or second moving vehicle, wherein the method includes performing one or more secure key exchange between the first moving vehicle and the second moving vehicle, wherein the method includes using point to point communications between the first moving vehicle and the second moving vehicle, and wherein the one or more secure key exchange is responsive to one or more secure channel communication between a computing node based system external to the first moving vehicle and the second moving vehicle and one or more of the first moving vehicle or second moving vehicle.

13. A computer program product comprising:
a computer readable storage medium readable by one or more processing unit and storing instructions for execution by one or more processor for performing a method comprising:
   obtaining, by one or more processor, one or more vehicle parameter of first and second moving vehicles;
   processing, by the one or more processor, the one or more vehicle parameter of first and second moving vehicles to determine rendezvous point information;
   outputting, by the one or more processor, data of the rendezvous point information to the first and second moving vehicles; and
   repeating, by the one or more processor, the obtaining, the processing and the outputting, wherein the obtaining, processing, outputting and repeating includes performing the obtaining, processing, outputting and repeating by a computing node based system external to the first moving vehicle and the second moving vehicle, and handing off the performing of the obtaining, processing, outputting and repeating for performance by a computing node based system located on one or more of the first moving vehicle or second moving vehicle, wherein the handing off is responsive to a determination that the first moving vehicle and second moving vehicle are at matching locations according to a matching criteria, the matching criteria including the criteria that the first moving vehicle and the second moving vehicle are within a threshold distance of one another.

14. The computer program product of claim 13, wherein the method includes determining whether a location of the first moving vehicle matches a location of the second moving vehicle according to a matching criteria, and wherein the repeating is performed if according to the determining the location of the first moving vehicle does not match a location of the second moving vehicle.

15. The computer program product of claim 13, wherein the obtaining, the processing and the outputting are performed by one or more of the following selected from the group consisting of the first moving vehicle and the second moving vehicle.

16. The computer program product of claim 13, wherein the outputting includes outputting one or more of the following selected from the group consisting of route information, speed information, and rendezvous point location information.

17. A system comprising:
a memory;
at least one processor in communication with the memory; and
program instructions executable by one or more processor via the memory to perform a method comprising:
   obtaining, by one or more processor, one or more vehicle parameter of first and second moving vehicles;
   processing, by the one or more processor, the one or more vehicle parameter of first and second moving vehicles to determine rendezvous point information;
   outputting, by the one or more processor, data of the rendezvous point information to the first and second moving vehicles; and
   repeating, by the one or more processor, the obtaining, the processing and the outputting, wherein the obtaining, processing, outputting and repeating includes performing the obtaining, processing, outputting and repeating by a computing node based system external to the first moving vehicle and the second moving vehicle, and handing off the performing of the obtaining, processing, outputting and repeating for performance by a computing node based system located on one or more of the first moving vehicle or second moving vehicle, wherein the handing off is responsive to a determination that the first moving vehicle and second moving vehicle are at matching locations according to a matching criteria, the matching criteria including the criteria that the first moving vehicle and the second moving vehicle are within a threshold distance of one another.

18. The method of claim 1, wherein the method includes mechanically coupling by the one or more processor, the first moving vehicle and the second moving vehicle using respective computer machine vision systems of the first moving vehicle and the second moving vehicle, wherein the mechanically coupling is performed responsively to a determination that a location of the second moving vehicle matches a location of the first moving vehicle according to a matching criteria.

19. The method of claim 1, wherein the method includes displaying to a user of the first moving vehicle a displayed user interface for display of displayed rendezvous information, the displayed rendezvous information including (a) text that specifies an arrival time for the first moving vehicle for a certain location with rendezvous functionality to facilitate a meeting between the first moving vehicle and the second moving vehicle active; and (b) text that specifies an arrival time for the first moving vehicle for the certain location with the rendezvous functionality to facilitate a meeting between the first moving vehicle and the second moving vehicle inactive, wherein the displayed user interface is configured to permit the user to cancel a rendezvous so that the rendezvous functionality is inactive.

* * * * *